United States Patent [19]

Esser et al.

[11] 4,184,691

[45] Jan. 22, 1980

[54] WORKPIECE HOLDER FOR A VERTICAL BROACHING MACHINE FOR BROACHING ANNULAR WORKPIECES

[75] Inventors: Gustav Esser; Wolfgang Marten, both of Solingen, Fed. Rep. of Germany

[73] Assignee: Oswald ForstMaschinenfabrik und Apparatebauanstalt GmbH, Solingen, Fed. Rep. of Germany

[21] Appl. No.: 880,168

[22] Filed: Feb. 21, 1978

[30] Foreign Application Priority Data

Feb. 23, 1977 [DE] Fed. Rep. of Germany ....... 2707648

[51] Int. Cl.² .................. B23B 31/20; B23B 31/36
[52] U.S. Cl. ................................. 279/5; 74/826; 269/64; 279/4; 279/52; 409/278
[58] Field of Search ............... 279/5, 47, 48, 49, 52, 279/4; 269/64; 74/813 L, 826; 90/83, 84, 88, 89, 15.1, 56 R, 57

[56] References Cited

U.S. PATENT DOCUMENTS

| 1,677,889 | 7/1928 | Gairing | 279/49 X |
|---|---|---|---|
| 3,054,333 | 9/1962 | Brainard et al. | 74/826 X |
| 3,685,845 | 8/1972 | Fisher et al. | 279/5 |
| 3,877,323 | 4/1975 | Vetsch | 74/826 |

*Primary Examiner*—Z. R. Bilinsky

*Attorney, Agent, or Firm*—Browdy and Neimark

[57] ABSTRACT

A workpiece holder for a vertical broaching machine for broading annular workpieces is particularly useful for simultaneous broaching of two ball-bearing races in the rings of homokinetic joints. A workpiece support, rotatable relative to a baseplate about a common axis and accepting the workpiece coaxially by means of a tightening device, is nonrotatably connected to a double-ended piston which can be subjected to the action of pressure-oil, the piston being guided rotatably and axially displaceably between two end positions in a cylinder. Complementary set of teeth are provided at one end of the piston and on a facing surface, nonrotatably connected to the baseplate, these teeth being in mesh when the piston is in the first end position, thus centering the piston and holding it in a nonrotational manner. A first pressure-oil connection terminates in the chamber delimited by the teeth, the piston being displaced axially to the other end position when the chamber is pressurized with pressure-oil, with the teeth being out of mesh when the piston is in the latter position. An additional chamber, connected to a second pressure-oil connection, is formed between the piston and the cylinder, the piston being displaced back to the first end position when this additional chamber is charged with pressure oil.

6 Claims, 6 Drawing Figures

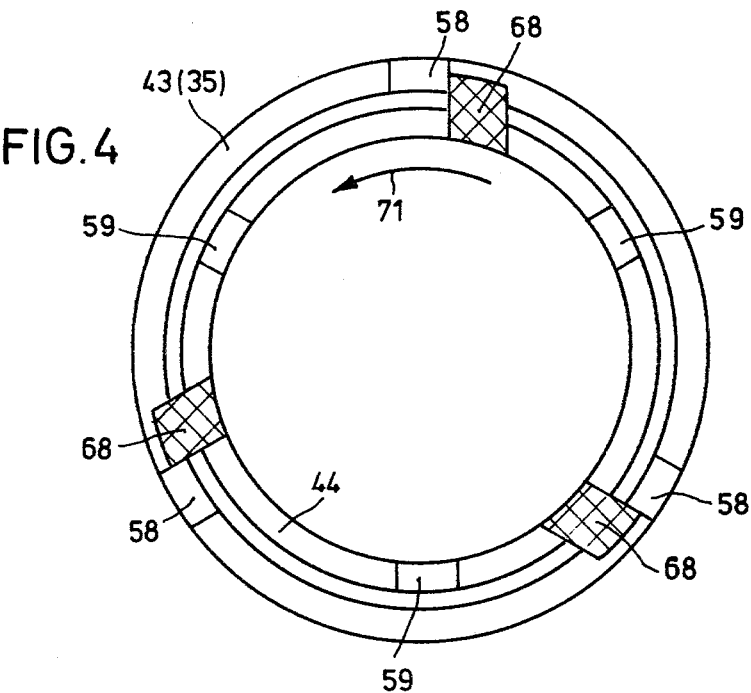
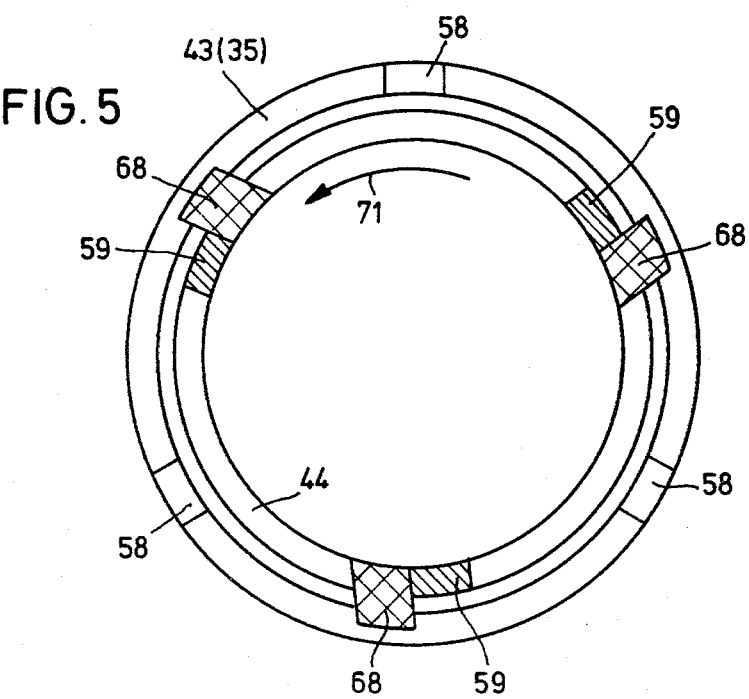

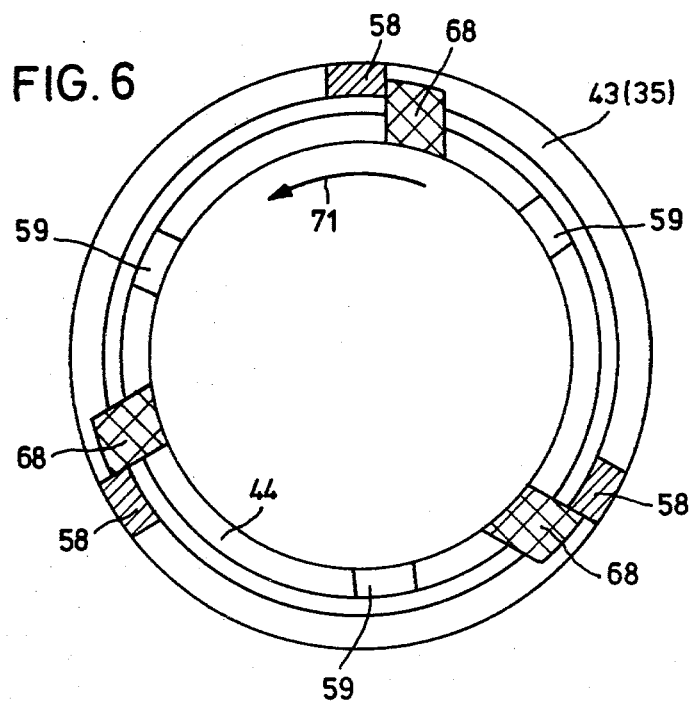

WORKPIECE HOLDER FOR A VERTICAL BROACHING MACHINE FOR BROACHING ANNULAR WORKPIECES

FIELD OF THE INVENTION

The present invention relates to a workpiece holder for a vertical broaching machine for broaching annular workpieces, especially for simultaneous broaching of two ball-bearing races in the rings of homokinetic joints, whereby a workpiece support disposed on a baseplate for axial location of the workpiece, a device for tangential location of the workpiece, and a device for radial location and centering of the workpiece are provided.

BACKGROUND OF THE INVENTION

Homokinetic joints are known from U.S. Pat. No. 3,218,827. Like the so-called cardan joints, they serve to transmit rotary motion from one rotating part to another rotating, driven part, when the rotational axes of these two rotating parts are not coaxial. Homokinetic joints consist essentially of an outer ring, flanged to the driven part, for example the wheel of an automobile, and an inner ring, fastened to the driving part, for example the drive shaft of an automobile. The inner ring has the approximate shape of a spherical disk, so that it can turn and swivel in the outer ring, whose interior is approximately cylindrical. Grooves, whose cross sections correspond approximately to ⅛ of a circle, are provided in the outer surface of the inner ring and the inner surface of the outer ring, whereby a ball is disposed in each groove of the inner ring and the corresponding groove of the outer ring. These balls are prevented by a cage from falling out of the grooves, which therefore serve as ball-bearing races.

Joints of this type have the considerable advantage that, unlike cardan joints, the driven part does not receive any of the rotary oscillating movement superimposed on the rotational movement, whereby a rotational oscillating movement of this type, which appears superimposed in the case of cardan joints, depends upon the angle between the axis of the driving part and the axis of the driven part.

The grooves in the inner and outer rings, which serve as ball-bearing races, do not run parallel to the rotational axes of these rings, but are inclined at an angle to these axes. Moreover, these grooves can always be inclined in the same direction, in other words parallel to one another or differently from one another, whereby the angle of inclination relative to the axis is always the same, regardless of the amount.

In a vertical broaching machine, known from U.S. Pat. No. 3,799,030, for broaching such rings of homokinetic joints, a workpiece grip is provided, by means of which the workpieces are removed from the workpiece holder after broaching and delivered to an indexing device in which they are turned through a set angle, for example 120° when there are three groove pairs, and then returned to the workpiece holder. A prismatic wedge is provided on the broaching machine for tangential, axial, and radial location of the workpiece on the workpiece holder, said wedge being supported on the one hand by wedge-shaped surfaces in a corresponding recess in a holding pin on the workpiece holder, and being provided on the other hand with a convex surface on its exterior, said surface engaging a previously broached ball-bearing race, thereby guiding and locating the workpiece axially, tangentially, and radially. When broaching a first pair of ball-bearing races, the prismatic wedge engages the corresponding recess in the holding pin only with that part of its cross section which is located at its free end. In the vicinity of this free end, the prismatic wedge is provided with a surface that rests against the inside wall of the workpiece. Broaching machines with this workpiece holder have proven to be extremely satisfactory in principle. In the case of tolerances amounting to several microns in the bore of the workpiece, however, the result is that corresponding defects appear in the position of the grooves to be broached relative to the axis of symmetry of the workpiece. Furthermore, it is costly from the structural standpoint, time-consuming during the manufacturing process, and a source of additional inaccuracies in manufacture if the workpieces have to be removed from the workpiece holder between the individual broaching steps.

SUMMARY OF THE INVENTION

Hence, an object of the present invention is to design a workpiece holder of the type described hereinabove in such manner that absolutely error-free centering and indexing of the workpiece is possible, without the workpiece having to be removed from the workpiece holder for indexing between the two broaching steps.

These and other objects are achieved according to the present invention by virtue of the fact that the workpiece support, rotatable relative to a baseplate about a common axis and accepting the workpiece coaxially by means of a tightening device, is nonrotatably connected to a double-ended piston which can be subjected to the action of pressure oil, the piston being guided rotatably and axially displaceably between two end positions in a cylindder. A complementary set of teeth is provided at one end of the piston and on a facing surface, nonrotatably connected to the baseplate, these teeth being in mesh when the piston is in the first end position, thus centering the piston and holding it in a nonrotational manner. A first pressure-oil connection terminates on the chamber delimited by the teeth, the piston being displaced axially to the other end position when the chamber is pressurized with pressure oil, with the teeth being out of mesh when the piston is in the latter position. An additional chamber, connected to a second pressure-oil connection, is formed between the piston and the cylinder, the piston being displaced back to the first end position when this additional chamber is charged with pressure oil. Advantageously, the teeth are in the form of serrations, or Hirth teeth. The measures according to the invention ensure that the devices for centering and tangentially locating the workpiece can be disposed in the extraordinarily small amount of space available in the workpiece holder. The space required to accommodate the teeth is simultaneously designed as a working chamber for the piston which is pressurizable at both ends. The displacement path of the piston and hence the workpiece support which supports the workpiece need be made only slightly larger than the maximum height of the teeth. In turn, this results in a situation in which only small amounts of pressure oil are required to bring the piston together with the workpiece support into the first end position, in which it is locked tangentially and centered, and to the second end position, in which it is freely movable. In this second end position, the workpiece support is rotated together with the workpiece, through approximately the same angle by which the workpiece is to be indexed. Exact centering and tangential alignment are accomplished when the teeth are in mesh, the number of said teeth naturally being such that a preset angle of 120° for example can be set. The indexing of the workpiece support with the piston in the end position in which it is freely rotatable, can be accomplished externally in any fashion.

According to another advantageous embodiment of the invention, the tensioning device consists of a tensioning ring with a tensioning sleeve, said ring being screwable into the workpiece support from above, the gripping surfaces of the tensioning sleeve, resting against the outer surface of the workpiece, having their outer surfaces resting against a guide surface of the workiece support which tapers frustroconically. Hence, the workpiece is gripped for the entire processing procedure, consisting of several broaching steps, from above, by means of a simple rotation of the tensioning ring. After processing, this tensioning device is released by rotating it in the opposite direction; the workpiece can then be lifted upward out of the workpiece holder.

BRIEF DESCRIPTION OF THE DRAWINGS

Further advantages and features of the invention will be apparent from the description of one embodiment with reference to the drawing.

FIG. 4 is a top view of the workpiece holder at the beginning of a tensioning process for a workpiece or an indexing process;

FIG. 5 shows the tensioning of a workpiece, beginning with the situation shown in FIG. 4; and FIG. 6 shows the indexing of a workpiece, beginning with the situation shown in FIG. 4.

DETAILED DESCRIPTION OF A PREFERRED EMBODIMENT

Figure 1:
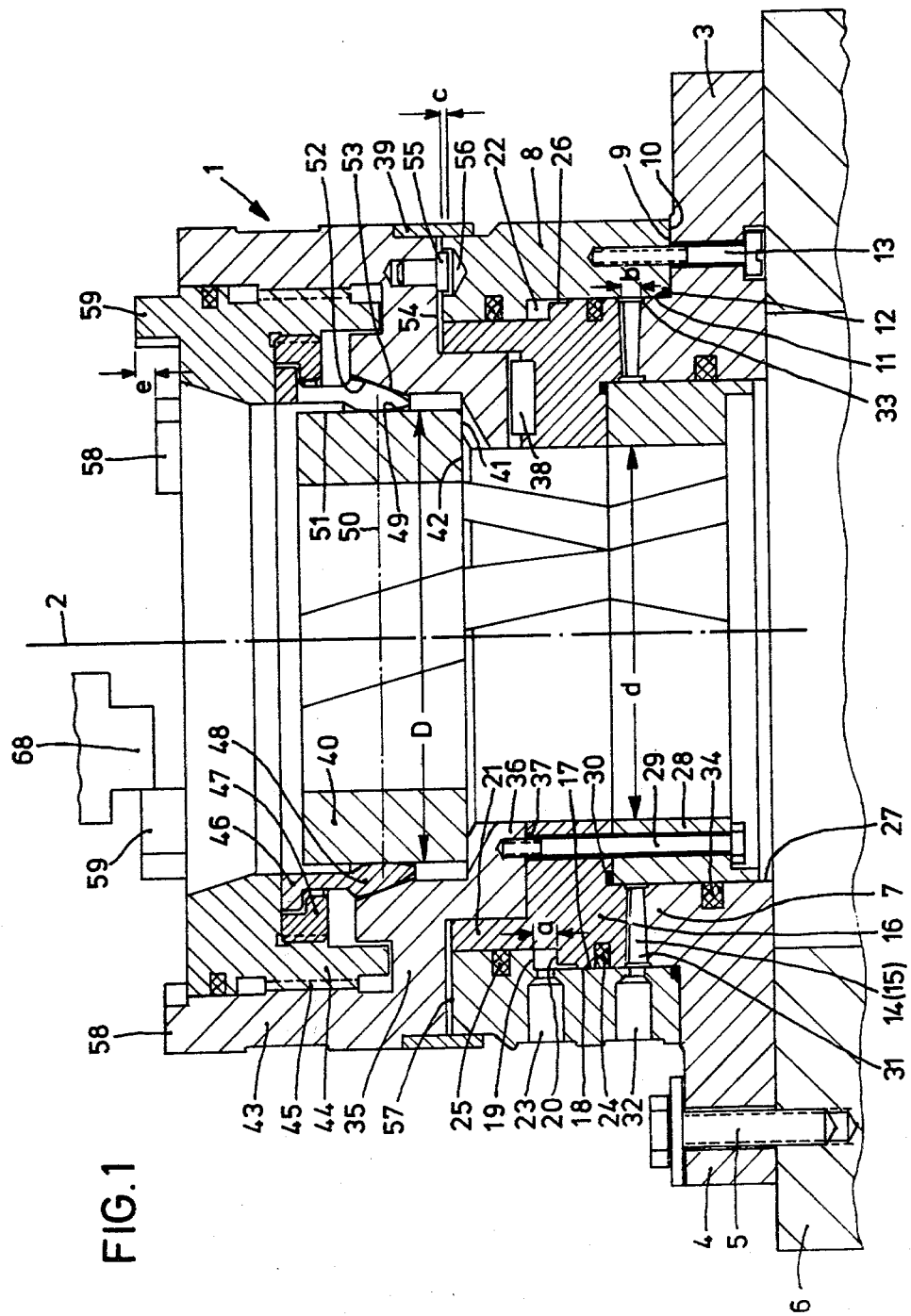
FIG. 1 is a vertical median lengthwise section through a workpiece holder according to the invention, with the workpiece support centered and locked tangentially in a first end position.

Workpiece holder 1 shown in FIG. 1 is made essentially rotationally symmetrical relative to an axis 2. It is provided with a baseplate 3, with bores 4 provided on its outer circumference, through which bores workpiece holder 1 is fastened to a carriage 6 of a vertical broaching machine by bolts 5.

Baseplate 3 is proved with a bead 7, said bead being annularly cylindrical and projecting upward, with a cylinder 8, extending upward and made approximately cylindrical, abutting the radially outwardly located surface of said bead, said cylinder resting with its lower end 9 upon a corresponding support surface 10 on the upper surface of baseplate 3. In the vicinity of the angle between bead 7 and support surface 10, a circular recess 11 is provided in cylinder 8, with a sealing ring 12 being accommodated in said recess. Cylinder 8 is firmly connected to baseplate 3 by bolts 13.

A serration 14 is provided on the upper surface of bead 7 of baseplate 3, in other words, a gear with straight radial teeth, with a corresponding serration 15 on the corresponding underside of an annular piston 16 engaging said teeth. Serrations of this kind are generally known, and are used in particular for making rigid couplings.

Figure 2:
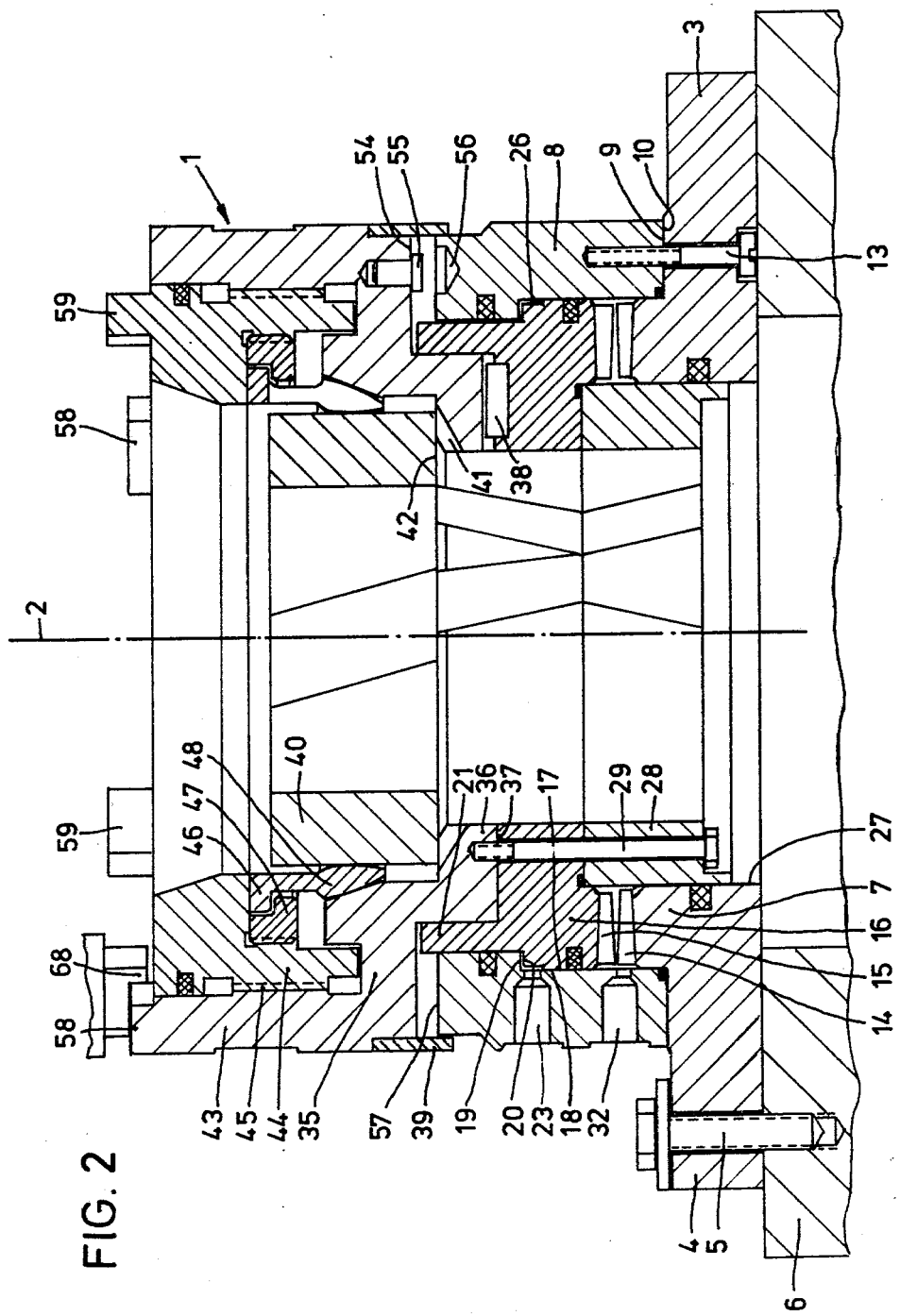
FIG. 2 shows the workpiece holder according to FIG. 1, in which the workpiece support is released in a second end position and is freely rotatable.

Piston 16 is provided with an annularly cylindrical guide surface 17 which abuts a likewise annularly cylindrical inside wall 18 of cylinder 8, and is displaceable relative to said cylinder in the direction of axis 2 between two positions, one of said positions being shown in FIG.1, whereby piston 16 rests upon bead 7 of baseplate 3 and the two serrations 14, 15 are in mesh. The other end position is constituted by a stop 19 on cylinder 8, said stop projecting radially inward, against which stop a likewise radially extending piston surface 20 can abut (FIG. 2). In the position shown in FIG. 1, distance a between stop 19 and piston surface 20 is slightly larger than the maximum height b of the teeth in the serrations 14 or 15, so that the two serrations 14 and 15 are out of mesh when piston 16 is raised sufficiently far that piston surface 20 comes to rest against stop 19. An annular pin 21 projects coaxially upward out of piston 16, said pin delimiting the piston surface 20 on the inside. Its outer surface is axially displaceably but radially nondisplaceably guided on a corresponding surface of cylinder 8 which delimits stop 19. A space 22 is delimited between stop 19 and piston surface 20 and between the outer wall of annular pin 21 and between the inside wall 18 of cylinder 8, with a pressure-oil connection 23 terminating in said space. This space 22 is sealed off by an annular seal 24 between guide surface 17 and inner wall 18 and an annular seal 25 between annular pin 21 and the corresponding inside wall of cylinder 8. An annular recess 26 is cut in the guide surface 17 of piston 16, in contact with piston surface 20, said recess being connected with space 22, so that when piston surface 20 abuts stop 19, pressure oil can be forced in through a pressure-oil connection 23 and can cause piston surface 20 to move off of stop 19.

A bore 27 is provided in annular baseplate 3, a ring 28 being guided axially displaceably against the wall of said bore, said ring being screwed to piston 16, by means of through bolts 29 passing through said piston, and a workpiece support, to be described in greater detail hereinbelow. An annular seal 30 is disposed between the abutting surfaces of ring 28 and piston 16. A pressure-oil connection 32 terminates in the chamber 31 formed of serrations 14 and 15. In the vicinity of the the teeth of serrations 14 and 15, an annular channel 33, open to the outside, is cut in bead 7 of baseplate 3 and guide surface 17 of piston 16, so that when serrations 14 and 15 are in contact as shown in FIG. 1, pressure oil is forced into a chamber 31 and serrations 14 and 15 can be separated from one another. Chamber 31 with an annular channel 33 is sealed by annular seal 30, sealing ring 12, annular seal 34 between ring 28 and the wall of bore 27, and annular seal 24 in a fluid-tight manner.

A workpiece support 35 is mounted on piston 16, said support meshing with a projecting bead 36 with annular pin 21, being held radially nondisplaceably thereby. Bead 36 rests upon a corresponding end 37 of piston 16, and is screwed to the latter by means of bolts 29, whereby it is connected axially nondisplaceably with piston 16. A non-rotational, therefore tangentially fixed connection is produced between workpiece support 35 and piston 16 by a spring-and-groove connection 38 between bead 36 and end 37. A sealing ring 39 which fits around the outside wall of cylinder 8, is mounted on the outside wall of workpiece support 35, said ring 39 being axially displaceable upon the corresponding outside surface of cylinder 8. The inside diameter d of ring 28, piston 16, and bead 36 of workpiece support 35 is smaller than the outside diameter D of an annular workpiece 40, the outer ring being a so-called homokinetic joint, so that a radially extending workpiece support surface 41 is formed in workpiece support 35, upon which surface 41 workpiece 40 can rest with its corresponding lower end 42. A tensioning ring 44 is screwed into an annularly cylindrical projecting section 43 of workpiece support 35 by means of corresponding threads 45 on the inside of section 43 or the outside of tensioning ring 44 from above. A tensioning sleeve 46 is held axially nondisplaceably against the inside of tensioning ring 44 by means of a locking ring 47 screwed from below into tensioning ring 44. This tensioning sleeve 46 is slotted axially, forming individual tightening surfaces 48, which rest against a slightly spherical internal surfce 49 in the vicinity of a medium transverse plane 50, indicated by the dot-dashed line, on the outer surface 51 of workpiece 40. The outside surfaces 52 of the gripping surfaces are made frustroconical, tapering downward, and are likewise slightly spherical, and rest upon a guide surface 53 which tapers downward and is frustroconical, so that by screwing tensioning ring 44 into workpiece 35, the gripping surfaces 48 are firmly pressed against the outside surface 51 of workpiece 40, whereby the latter is held radially firmly and nondisplaceably in workpiece support 35. The tensioning forces are so great that the workpiece is also gripped nonrotatably and nondisplaceably axially upward. By unscrewing tensioning ring 44 upward out of workpiece support 35, this clamping connection is released, so that workpiece 40 can be withdrawn upward. The smallest inside diameter of tensioning ring 44 is greater than the diameter D of workpiece 40.

A projection 55 is provided on the underside 54 of workpiece support 35 in the vicinity of its outer edge, said projection, in the position shown in FIG. 1, fitting into a corresponding blind hole 56 in the upper surface of cylinder 8 which is connected to baseplate 3. With the workpiece support 35 in the position shown in FIG. 2, on the other hand, projection 55 has been withdrawn from blind hole 56 and is free of cylinder 8. The height c by which projection 55 in the positon shown in FIG. 1 enters blind hole 56 is smaller than the distance a between stop 19 and piston surface 20, and greater than the maximum height b of the teeth in serrations 14 or 15. Blind holes 56 of this kind are diposed on the upper surface 57 of cylinder 8 at the same angle intervals by which workpiece support 35 is to be rotated when indexing. When broaching the above-described rings of homokinetic joints, such blind holes 56 are disposed at intervals of 120°. The diameter of projection 55 is smaller than the diameter of blind holes 56, whereby the lateral play between projection 55 and the corresponding walls of blind holes 56 is smaller in degrees than half the angular distance between two adjacent teeth in serrations 14 and 15.

Three annular-cylinder-section-shaped dogs 58 are mounted on the upper surface of section 43 of workpiece support 35. Likewise, three similarly annular-cylinder-section shaped dogs 59 are mounted on the upper surface of tensioning ring 44 at the same angular intervals. Dogs 59 are higher than dogs 58, whereby their heights e as measured along the axis 2 correspond approximately to the distance a mentioned hereinabove.

Carriage 6 supporting workpiece holder 1 is mounted displaceably on a machine table 60 of a vertical broaching machine 61. In the usual fashion, machine table 60 is supported on a base 62. As is generally the case in broaching machines, base 62 is provided with guide columns 63, between which a tool carrige 64 is vertically displaceable, whereby hydraulic working cylinders are provided to drive the tool carriage of which only piston rods 65 are shown. A broaching carriage, not shown, is mounted in the usual fashion in frame 62, by means of which carriage broach 66 can be pulled downward through a workpiece 40 gripped in workpiece holder 1.

Figure 3:
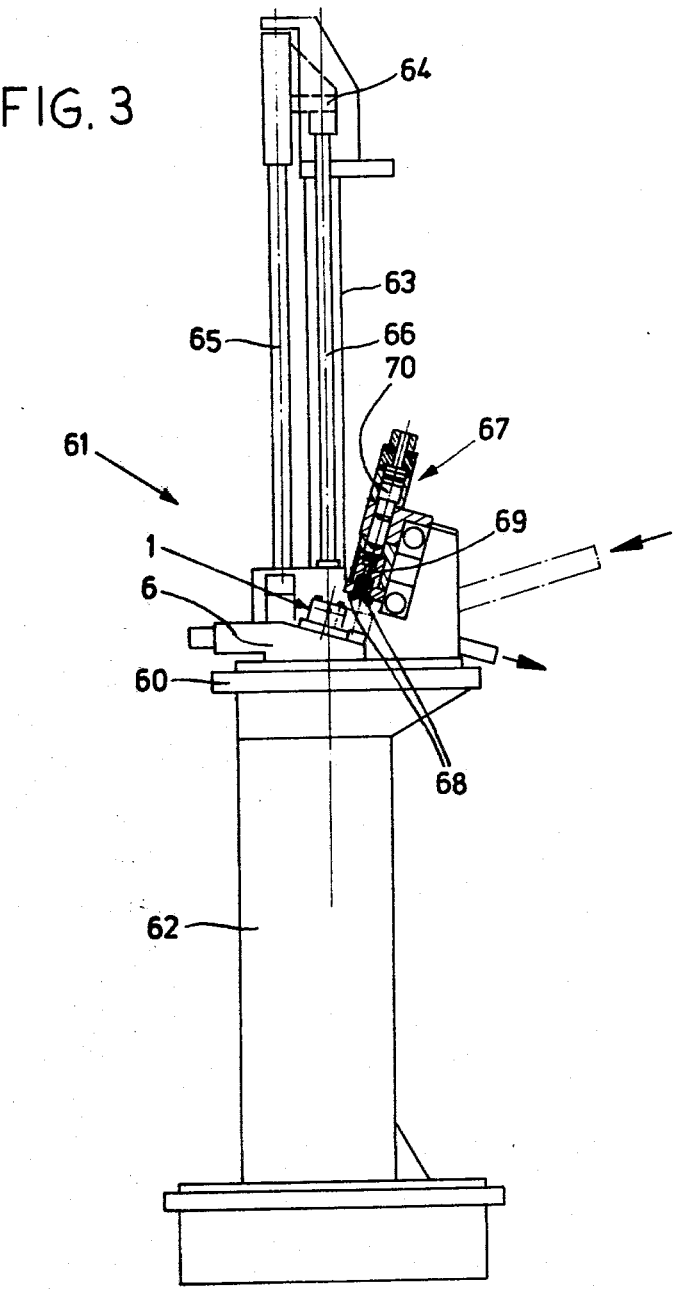
FIG. 3 is a vertical broaching machine with a workpiece holder according to the invention shown in schematic form.

When broach 66 has been pulled downward through workpiece 40 following a broaching operation, the carraige moves away from the broaching position for indexing (toward the right in FIG. 3), beneath a tensioning and indexing device 67, which is likewise provided on its underside at equal angle intervals with three drive pins 68, said pins being mounted on a rotatable shaft 69. The shaft itself is axially displaceable by means of a hydraulic working cylinder 70 into an engaged position between drive pins 68 and dogs 58 and 59, or can be pulled out of it. If, as shown in FIG. 1, the teeth of serrations 14 and 15 are in mesh, only the dogs 59 which are on tensioning ring 44 engage drive pins 68. On the other hand, if as shown in FIG. 2, workpiece support 35 has been raised, dog 58 of workpiece support 35 engage drive pin 68.

In FIGS. 4 to 6, the gripping and indexing process is shown. The initial position of drive pins 68 is always that shown in FIG. 4. For gripping (FIG. 5) or indexing (FIG. 6), shaft 69 of the gripping and indexing device 67 is rotated so that drive pins 68 are rotated in the direction shown by arrow 71. If, as shown in FIG. 1, workpiece support 35 is in the lower, and therefore locked position, drive pins 68 move above dogs 58 of workpiece support 35 and engage dogs 59 of tensioning ring 44 in the course of their rotary movement, turning the latter from the open position of the tensioning ring 44 shown in FIGS. 4 to the tightened position shown in FIG. 5. It should be pointed out in this connection that thread 45 is made so that a rotation of only a few degrees, for example 10°–15°, is necessary to bring tensioning ring 44 from a loose position to a tightened position.

On the other hand, if workpiece support 35 is in the raised position shown in FIG. 2, in which serrations 14 and 15 are out of mesh, drive pins 68 engage dogs 58 of workpiece support 35 and swivel the latter for indexing through a set angle of 120° for example. As indicated by FIGS. 4 to 6, dogs 59 of tensioning ring 44 are located, whether this ring is in the loose or the tensioned position, in such manner between two adjacent dogs 58 of workpiece support 35, that drive pins 68 cannot collide with drive pins 59 during indexing.

In order to make the processes described above in FIGS. 4 and 6 easier to understand, drive pins 68 are always shown with a cross-hatched pattern and in FIG. 5 the dogs 59 which are gripped during tensioning are shown shaded, while in FIG. 6 the dogs 58 involved in indexing are shown shaded.

During indexing, in other words with workpiece support 35 in the upper end position shown in FIG. 2, the projection or projections 55 are lifted out of the corresponding blind holes 56 and travel over the upper surface 57 of cylinder 8. Workpiece support 35 can only be lowered if the projection 55 is once again above a blind hole 56, in other words if the indexing error is greater, workpiece support 35 cannot be lowered; in other words adjustment and locking cannot be carried out using the serrations 14 and 15.

The different heights of dogs 58 on the one hand and 59 on the other make it possible, therefore, with a single tensioning and indexing device 67, to grip workpieces 40 and index them.

It will be obvious to those skilled in the art that various changes may be made without departing from the scope of the invention and the invention is not to be considered to be limited to what is shown in the drawings and described in the specification.

We claim:

1. A workpiece holder for a vertical broaching machine for broaching annular workpieces in a sequence of steps without removing the workpiece from the holder, the holder comprising:
   a baseplate having serrations on one surface thereof;
   a workpiece support means, rotatably disposed relative to said baseplate, for axial location of the workpiece;
   a piston, nonrotatably connected to said workpiece support means, and having serrations, complementary to the serrations on said baseplate, on one surface thereof facing the surface of said baseplate on which are the serrations thereof;
   a cylinder in which said piston is rotatably and axially displaceably disposed between two axial end positions, the serrations on said piston being in engagement with the serrations on said baseplate, thereby holding said piston centered and nonrotatable, at the first end position and said serrations being out of engagement at the second end position;
   a first chamber means delimited by said serrations for receiving pressure oil which forces said piston to the second position thereof when it is desired for said serration to be out of engagement;
   a second chamber means formed between said piston and said cylinder for receiving pressure oil which forces said piston to the first position thereof when it is desired for said serration to be in engagement; and
   tensioning means for radial location and centering of the workpiece within said workpiece support means, and wherein said tensioning means includes a tensioning ring screwed into said support means from above, and a tensioning sleeve, connected to said tensioning ring, abutting the outer surface of the workpiece at the inner tightening surface of said sleeve and abutting a frustoconically tapering surface of said workpiece support means at the outside surface of said sleeve, whereby screwing of said tensioning ring into said workpiece support means causes said tensioning sleeve to firmly connect the workpiece to said workpiece support means in a centered position with respect thereto.

2. A workpiece holder in accordance with claim 1 wherein the serrations of said baseplate and the complementary serrations of said piston are in the form of gears having teeth in the form of serrations.

3. A workpiece holder in accordance with claim 1 wherein the maximum axial displacement of said piston is only slightly greater than the maximum height of said serrations.

4. A workpiece holder in accordance with claim 1 wherein said first chmber means and said second chamber means are sealed.

5. A workpiece holder in accordance with claim 1 further including first dogs mounted on the upper surface of said tensioning means and second dogs mounted on the upper surface of said workpiece support means, wherein said first dogs and said second dogs have different axial lengths.

6. A workpiece holder in accordance with claim 1, wherein said workpiece support means comprises a workpiece support ring-like member, wherein said tension ring has an upper surface and further including first dogs mounted on said upper surface of said tensioning ring and second dogs mounted on said upper surface of said workpiece support ring-like member, said first dogs and said second dogs having different axial lengths.

* * * * *